US007856210B2

(12) United States Patent
Karlsson

(10) Patent No.: US 7,856,210 B2
(45) Date of Patent: Dec. 21, 2010

(54) POWER STEP CONTROL FOR HIGH-SPEED DOWNLINK SHARED CHANNEL PACKET ACCESS

(75) Inventor: Patrik Karlsson, Alta (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 859 days.

(21) Appl. No.: 11/721,761

(22) PCT Filed: Dec. 17, 2004

(86) PCT No.: PCT/SE2004/001914

§ 371 (c)(1), (2), (4) Date: Jun. 14, 2007

(87) PCT Pub. No.: WO2006/065182

PCT Pub. Date: Jun. 22, 2006

(65) Prior Publication Data

US 2008/0130610 A1 Jun. 5, 2008

(51) Int. Cl.
H04B 7/00 (2006.01)
(52) U.S. Cl. .............. 455/69; 455/452.2; 455/522; 370/278
(58) Field of Classification Search .......... 370/230, 370/278, 310, 329, 330, 335, 336, 342, 395.4, 370/412, 474, 320, 441; 455/69, 452.1–452.2, 455/509, 517, 522; 375/130, 295, 338
See application file for complete search history.

(56) References Cited

U.S. PATENT DOCUMENTS 7,295,538 B2 * 11/2007 Aizawa et al. .............. 370/332

2003/0210668 A1 * 11/2003 Malladi et al. .............. 370/335
2004/0022213 A1    2/2004 Choi
2004/0085936 A1 *  5/2004 Gopalakrishnan et al. ... 370/335
2005/0063344 A1 *  3/2005 Winzell ...................... 370/335
2006/0240859 A1 * 10/2006 Gervais et al. .............. 455/522
2008/0002618 A1 *  1/2008 Murata et al. ............... 370/329

FOREIGN PATENT DOCUMENTS

EP    1463230 A2    9/2004

* cited by examiner

Primary Examiner—Kamran Afshar
Assistant Examiner—Marisol Fahnert

(57) ABSTRACT

A radio access network node comprises a transport format selector (44) which uses plural input parameters for determining a transport format for a high-speed downlink shared channel (HS-DSCH). The transport format selector is arranged to protect radio quality (e.g., the signal to noise ratio (SIR)) of the high-speed downlink shared channel (HS-DSCH) against a radio quality fluctuation due to one or more of fast fading, power variations, or interference variations. The radio quality fluctuation may be a downlink power variation caused by or accompanying transmission on the high-speed downlink shared channel (HS-DSCH) itself (or any other channel such as a DPCH). The radio quality fluctuation may jeopardize reliability of or render inaccurate (e.g., stale) a reported value for a first input parameter ascribed to a radio condition and utilized to determine the transport format. The transport format selector promotes radio quality of the high-speed downlink shared channel (HS-DSCH) by compensating, in the determining of the transport format, for any inaccurate representation by the reported input value of a radio condition which may have changed at the time of transmission of the high-speed downlink shared channel (HS-DSCH). The first input parameter (for which the transport format selector anticipates a difference) can be, for example, a channel quality indicator (CQI) which represents the radio condition of radio channel quality.

12 Claims, 7 Drawing Sheets

POWER STEP CONTROL FOR HIGH-SPEED DOWNLINK SHARED CHANNEL PACKET ACCESS

BACKGROUND

1. Field of the Invention

The present invention pertains generally to telecommunications, and particularly to a High Speed Downlink Packet Access (HSDPA) system such as that operated (for example) in a Universal Mobile Telecommunications System (UMTS) terrestrial radio access network (UTRAN).

2. Related Art and Other Considerations

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. As wireless Internet services have become popular, various services require higher data rates and higher capacity. Although UMTS has been designed to support multi-media wireless services, the maximum data rate is not enough to satisfy the required quality of services. In a forum known as the Third Generation Partnership Project (3GPP), telecommunications suppliers propose and agree upon standards for third generation networks and UTRAN specifically, and investigate enhanced data rate and radio capacity.

One result of the forum's work is the High Speed Downlink Packet Access (HSDPA). The HSDPA system is provides, e.g., a maximum data rate of 10 Mbps and to improve the radio capacity in the downlink. FIG. 4 illustrates a high-speed shared channel concept where multiple users 1, 2, and 3 provide data to a high speed channel (HSC) controller that functions as a high speed scheduler by multiplexing user information for transmission over the entire HS-DSCH bandwidth in time-multiplexed intervals (called transmission time intervals (TTI)). For example, during the first time interval shown in FIG. 4, user 3 transmits over the HS-DSCH and may use all of the bandwidth allotted to the HS-DSCH. During the next time interval, user 1 transmits over the HS-DSCH, the next time interval user 2 transmits, the next time interval user 1 transmits, and so forth.

HSDPA achieves higher data speeds by shifting some of the radio resource coordination and management responsibilities to the base station from the radio network controller. Those responsibilities include one or more of the following (each briefly described below): shared channel transmission, higher order modulation, link adaptation, radio channel dependent scheduling, and hybrid-ARQ with soft combining.

In shared channel transmission, radio resources, like spreading code space and transmission power in the case of CDMA-based transmission, are shared between users using time multiplexing. A high speed-downlink shared channel is one example of shared channel transmission. One significant benefit of shared channel transmission is more efficient utilization of available code resources as compared to dedicated channels. Higher data rates may also be attained using higher order modulation, which is more bandwidth efficient than lower order modulation, when channel conditions are favorable.

Radio channel conditions experienced on different communication links typically vary significantly, both in time and between different positions in the cell. In traditional CDMA systems, power control compensates for differences in variations in instantaneous radio channel conditions. With this type of power control, a larger part of the total available cell power may be allocated to communication links with bad channel conditions to ensure quality of service to all communication links. But radio resources are more efficiently utilized when allocated to communication links with good channel conditions. For services that do not require a specific data rate, such as many best effort services, rate control or adjustment can be used to ensure there is sufficient energy received per information bit for all communication links as an alternative to power control. By adjusting the channel coding rate and/or adjusting the modulation scheme, the data rate can be adjusted to compensate for variations and differences in instantaneous channel conditions.

For maximum cell throughput, radio resources may be scheduled to the communication link having the best instantaneous channel condition. Rapid channel dependent scheduling performed at the bases station allows for very high data rates at each scheduling instance and thus maximizes overall system throughput. Hybrid ARQ with soft combining increases the effective received signal-to-interference ratio for each transmission and thus increases the probability for correct decoding of retransmissions compared to conventional ARQ. Greater efficiency in ARQ increases the effective throughput over a shared channel.

With HSDPA, the physical layer becomes more complex as an additional MAC protocol is introduced: the MAC-hs. On the network side, the MAC-hs protocol is implemented in the radio base station (RBS). The MAC-hs protocol contains the retransmission protocol, link adaptation, and channel dependent scheduling. The complexity increase with HSDPA is thus mainly related to the introduction of an intelligent Layer 2 protocol in the radio base station (RBS).

In the downlink from the radio access network to the mobile station, the radio transmission is not perfectly orthogonal. As a result, when a radio signal is transmitted, a self-interference will be created. For example, when a base station transmits X amount of power in the downlink for a connection, only Y % of the power will be useful energy, with the remainder (100−Y) % creating interference for the connection.

Radio access networks typically employ a parameter such as Channel Quality Indicator (CQI) to describe radio conditions in a cell. The CQI is a measure of the quality of the common pilot CPICH as reported by each mobile station (e.g., each user equipment unit ("UE")). Assume a scenario in which the CQI is estimated during a time of low system load (e.g., low total downlink cell power), so consequently the interference for that cell would also be very low during the time of low system load. But if system load were suddenly to increase for this scenario, as could occur when data is transmitted to the mobile station on a high-speed downlink shared channel (HS-DSCH), the high-speed downlink shared channel (HS-DSCH) would likely take all remaining cell power. In other words, the cell would then transmit at maximum downlink cell power. With the cell transmitting at maximum downlink cell power, the self-interference created the radio conditions would become worse, and certainly worse than what is represented by the previously reported "low load" CQI.

Thus, in the scenario discussed above, the input CQI for the scenario represented a better radio situation than what becomes the case later in the scenario when the high-speed downlink shared channel (HS-DSCH) is transmitting. In accordance with conventional practice, a transport format is selected for each user's TTI in the high-speed downlink shared channel (HS-DSCH) based on the user's respective CQI. The transport format affects such things as the energy per user data bit to be utilized for the transmission. When the earlier-established CQI inaccurately reflects the subsequent condition, the transport format selected for the transmission of the high-speed downlink shared channel (HS-DSCH) will be such as to use less energy per user data bit than optimal to achieve sufficient SIR, since the interference level is increased relative the CQI estimation period. Such inaccurate format selection and attendant inaccurate energy allocation typically results in an increase in failed transmissions. Failed transmission usually entails a need for retransmission. Unfortunately, retransmission results in decreased end-user throughput and negatively affects cell capacity.

What is needed, therefore, and an object herein provided for, are means, methods, and techniques for effectively establishing a high-speed downlink shared channel (HS-DSCH) that will not lead to deteriorated radio conditions.

SUMMARY

A radio access network node comprises a transport format selector which uses plural input parameters for determining a transport format for a high-speed downlink shared channel (HS-DSCH). The transport format selector is arranged to protect radio quality (e.g., the signal to noise ratio (SIR)) in the cell of the high-speed downlink shared channel (HS-DSCH) against a radio quality fluctuation due to one or more of fast fading, power variations, or interference variations. The radio quality fluctuation may be a downlink power variation caused by or accompanying transmission on the high-speed downlink shared channel (HS-DSCH) itself (or any other channel such as a DPCH). The radio quality fluctuation may jeopardize reliability of or render inaccurate (e.g., stale) a reported value for a first input parameter ascribed to a radio condition and utilized to determine the transport format.

The transport format selector promotes radio quality of the high-speed downlink shared channel (HS-DSCH) by compensating, in the determining of the transport format, for any inaccurate representation by the reported input value of a radio condition which may have changed at the time of transmission of the high-speed downlink shared channel (HS-DSCH). The first input parameter (for which the transport format selector anticipates a difference) can be, for example, a channel quality indicator (CQI) which represents the radio condition of radio channel quality.

In one example mode, the transport format selector uses the reported value of the channel quality indicator and at least another of the plural input parameters to obtain a candidate transport format size, and then uses an actual transport format size smaller than the candidate transport format size and less power for setting up the high-speed downlink shared channel (HS-DSCH). In using the smaller actual transport size, the transport format selector provides a greater energy per data bit than would be afforded by the candidate transport format size and thus counters any power step increase occasioned by transmission on the high-speed downlink shared channel (HS-DSCH). In one example implementation, the candidate transport format size can be obtained from a conventional mapped (lookup) transport format table.

In another example mode, in anticipating the difference between the reported input value and the actual value for the first input parameter, the transport format selector performs a modification of a value of a selected one of the plural input parameters to obtain a modified input parameter. The transport format selector further uses the modified input parameter and the other plural input parameters to obtain an actual transport format size, with uses all available downlink power for the high speed downlink shared channel. The actual transport format size so obtained is smaller than that would have been obtained had the modification not been performed, thereby improving the SIR compared to what would have occurred had the modification not been performed.

In one example implementation, the modified input parameter is available downlink power and the modified value is modified available downlink power. In setting up the TTI for the high-speed downlink shared channel (HS-DSCH), not all available downlink power is utilized but rather a diminished value thereof in conjunction with the smaller actual transport format size.

In another example implementation, the modified available downlink power ($P_{maDL}$) can be determined by the expression $P_{maDL}=P_{availableDL}-(K*(P_{totalDLcell}-P_{average\ reported}))$, wherein $P_{availableDL}$ is available downlink power; K is a constant less than 1.0; $P_{totalDLcell}$ is maximum downlink cell power; and $P_{average}$ reported is average power when the value of CQI was reported. In this example implementation all available downlink power is used for the TTI of the high-speed downlink shared channel (HS-DSCH) in conjunction with the smaller actual transport format size.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail.

Figure 1:
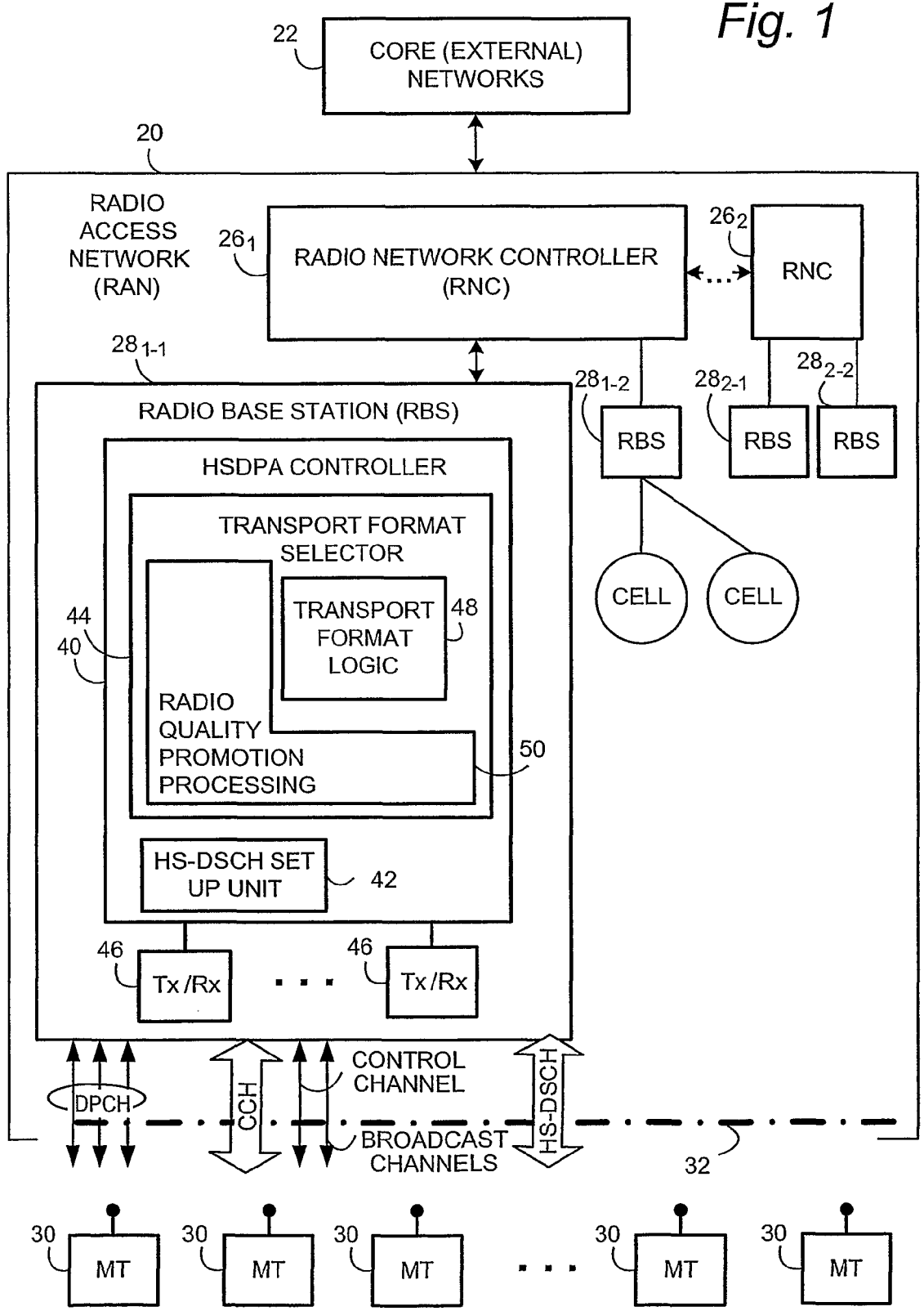
FIG. 1 is schematic view of example mobile communications system in which a transport format selector with radio quality promotion may be advantageously employed.

FIG. 1 illustrates an example, non-limiting telecommunications system wherein a radio access network 20 is connected to one or more external (e.g., core) networks 22. The external networks 22 may comprise, for example, connection-oriented networks such as the Public Switched Telephone Network (PSTN) and/or the Integrated Services Digital Network (ISDN), and/or connectionless external core network such as (for example) the Internet. One or more of the external networks have unillustrated serving nodes such as, e.g., a Mobile Switching Center (MSC) node and a General Packet Radio Service (GPRS) Service (SGSN) node working in conjunction with a gateway GRPS support node (GGSN).

Each of the core network service nodes connects to the radio access network (RAN) 20 over a suitable interface. In the particular, non-limiting example shown in FIG. 1, the radio access network (RAN) 20 is a UMTS Terrestrial Radio Access Network (UTRAN) and the interface with the external network is over the Iu interface. The radio access network (RAN) 20 includes one or more radio network controllers (RNCs) 26 and one or more radio base stations (RBS) 28. For sake of simplicity, the radio access network (RAN) 20 of FIG. 1 is shown with only two RNC nodes, particularly RNC $26_1$ and RNC $26_2$. Each RNC 26 is connected to one or more base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 1 shows that an RNC can be connected over an Iur interface to one or more other RNCs in the UTRAN 24. Further, those skilled in the art will also appreciate that a base station is sometimes also referred to in the art as a radio base station, a node B, or B-node.

It should be understood that at least one and likely more of the RNCs of the radio access network have an interface to one or more core networks. Further, in order to support continuation of established connections when the UE is moving between cells controlled by different RNCs in the Radio Access Network, a Signalling Network (e.g. Signalling System No 7) enables RNCs to perform the required RNC-RNC signalling.

In the illustrated embodiments, for sake of simplicity each base station 28 is shown as serving one cell. For base station $28_{1-2}$, for example, the cells are represented by a circle. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers.

As shown in FIG. 1, mobile terminals (MT) 30 communicates with one or more cells or one or more base stations (BS) 28 over a radio or air interface 32. In differing implementations, the mobile terminals (MT) 30 can be known by different names, such as wireless terminal, mobile station or MS, user equipment unit, handset, or remote unit, for example. Each mobile terminal (MT) may be any of myriad devices or appliances, such as mobile phones, mobile laptops, pagers, personal digital assistants or other comparable mobile devices, SIP phones, stationary computers and laptops equipped with a real-time application, such as Microsoft netmeeting, Push-to-talk client etc. Preferably, at least for a UTRAN implementation of the radio access network (RAN) 20, radio access is based upon Wideband, Code Division Multiple Access (WCDMA) with individual radio channels allocated using CDMA spreading codes. Of course, other access methods may be employed.

FIG. 1 further illustrates in simplified form that different types of channels may exist between one of the base stations 28 and mobile terminals (MT) 30 for transport of control and user data. For example, in the forward or downlink direction, there are several types of broadcast channels, one or more control channels, one or more common traffic channels (CCH), dedicated traffic channels (DPCH), and the high-speed downlink shared channel (HS-DSCH) which now is of particular interest. The downlink dedicated physical channel (DPCH) carries both the Dedicated Physical Data Channel (DPDCH) and the Dedicated Physical Control Channel (DPCCH).

The RNC 26 configures the cell to support HSDPA. Thereafter it is up to the RBS 28 to allocate power and the amount of codes, needed at respective TTI transmissions.

Base stations provided with high-speed downlink packet access capability have a high-speed downlink packet access controller, e.g., HSDPA controller 40 or similar channel manager that governs allocation and utilization of the high-speed downlink shared channel (HS-DSCH) and a high-speed shared control channel (HS-SCCH) which is utilized for signaling purposes. The HS-SCCH contains information which is sent to the mobile terminals to that the mobile terminals know if they have data to receive on the HS-PDSCh channel or not. The high-speed downlink shared channel (HS-DSCH) and the high-speed shared control channel (HS-SCCH) are separate channels. As understood by those skilled in the art, the signaling carried by the high-speed shared control channel (HS-SCCH) is performed by transmitting the HS-SCCH TTI two slots in advance of the corresponding HS-DSCH TTI.

HSDPA controller 40 can also be referred to as the HSDPA scheduler. The HSDPA controller 40 may be included with or separate from a node controller or the like which bears responsibility for overall node operation/coordination. Further, the HSDPA controller 40 may be implemented using individual hardware circuits, using software programs and data in conjunction with one or more suitably programmed digital microprocessors or general purpose computers, using application specific circuitry (ASIC), and/or using one or more digital signal processors (DSPs).

The HSDPA controller 40 includes HSDPA shared channel setup unit 42 which bears responsibility for coordinating setup of the high-speed downlink shared channel (HS-DSCH). The HSDPA shared channel setup unit 42 obtains from transport format selector 44 an appropriate format size for each time interval (TTI) of the high-speed downlink shared channel (HS-DSCH), and from the downlink power unit 52 an amount of downlink power to use for the TTI, and coordinates with one of the transceivers (Rx/Tx) 46 of radio base station (RBS) 28 for actual transmission of the TTI of the high-speed downlink shared channel (HS-DSCH).

The example embodiment of transport format selector 44 of FIG. 1 includes transport format logic 48 which, in manner already known by those familiar with high-speed downlink packet access technology, utilizes various input parameters to lookup, map, calculate, or otherwise obtain a transport format which is dependent upon the input parameters. The transport format (TF) for a user is selected once per transmission time interval (TTI), assuming that the user is transmitted. Using code multiplexing, it is possible for several users to transmit during a TTI.

In addition to having the transport format logic 48, the transport format selector 44 is enhanced with radio quality promotion processing 50. The radio quality promotion processing 50 implements preventive or precautionary measures and thereby obtains a more reasonable transport format for the high-speed downlink shared channel (HS-DSCH) in case one of the input parameters to transport format logic 48 should misjudge or (because, e.g., of anticipated staleness) inaccurately represent the radio conditions which will occur at the time of transmission of the TTI on the high-speed downlink shared channel (HS-DSCH).

Figure 2:
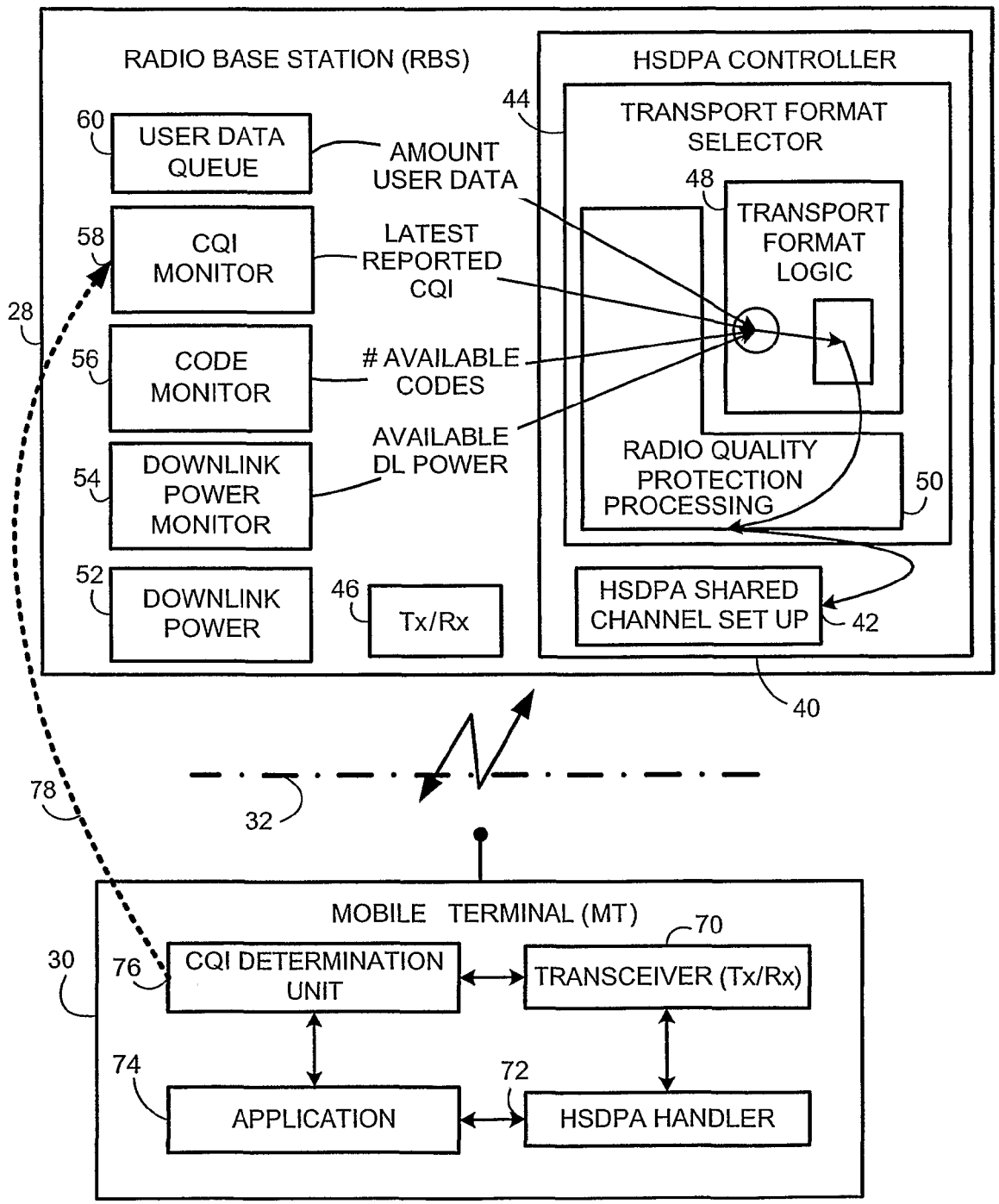
FIG. 2 is schematic view of a mobile terminal and a network node, with the network node having an example transport format selector with generic example radio quality promotion processing.

FIG. 2 shows, in somewhat more but selective detail, various constituent elements and/or functionalities of an example radio base station (RBS) 28 and an example mobile terminal (MT) 30. For sake of simplicity, FIG. 2 shows only one of its possible plural transceivers (Rx/Tx) 46 for radio base station (RBS) 28, i.e., the particular transceiver which will be utilized for the high-speed downlink shared channel (HS-DSCH). FIG. 2 also shows the HSDPA controller 40 with its HSDPA shared channel setup unit 42 and transport format selector 44, the transport format selector 44 including both transport format logic 48 and radio quality promotion processing 50. In addition, FIG. 2 shows radio base station (RBS) 28 as further comprising downlink power unit 52 and various monitors, such as downlink power monitor 54; code monitor 56; and, CQI (channel quality indicator) monitor 58.

Yet further, radio base station (RBS) 28 includes a user data queue 60 through which user data passes when applied to high-speed downlink shared channel (HS-DSCH). By monitoring user data queue 60, the radio base station (RBS) 28 knows how much data a user has in user data queue 60, so that the amount of user data in user data queue 60 can be communicated to transport format selector 44 as shown in FIG. 2.

The mobile terminal (MT) 30 of FIG. 2 includes, among its other numerous unillustrated components and functionalities, the following: MT transceiver 70; HSDPA handler 72 (which handles the HS-DSCH and monitors the HS-SCCH); HS-DSCH application 74; and CQI determination unit 76, all of which perform in a manner understood by the person skilled in the art. The user data received over the air interface by MT transceiver 70 on the high-speed downlink shared channel (HS-DSCH) may be utilized by the HS-DSCH application 74.

As illustrated by broken line arrow 78, the mobile terminal (MT) 30 via its CQI determination unit 76 periodically reports a channel quality indicator value to CQI monitor 58 of radio base station (RBS) 28. Specifically, each mobile terminal (MT) monitors the experienced downlink quality on the common pilot channel CPICH, and then transforms that to a DL CQI indicator which it reports up to the RBS. Although not explicitly shown as such in FIG. 2, in an example UTRAN implementation the channel quality indicator is signaled as an information element on the physical uplink channel HS-PD-CCH by MT transceiver 70. The frequency of the reporting of the CQI is determined by parameters sent to the mobile terminal (MT) by the radio access network, and is generally in the range of 20-200 milliseconds. The channel quality indicator is received over air interface 32 by the appropriate transceiver (Rx/Tx) 46 in radio base station (RBS) 28, and the CQI value is transmitted to CQI monitor 58. Thus, the CQI monitor 58 keeps track, e.g., of the latest reported CQI from each mobile terminal 30.

The downlink power monitor 54 works in conjunction with downlink power unit 52. The downlink power monitor 54 knows the amount of downlink (DL) power which is available at the radio base station (RBS) 28, and reports the same to transport format selector 44.

The code monitor 56 knows the unused amount of spreading codes (e.g., radio resources in CDMA systems), and reports the number of unused codes (i.e., available codes) to transport format selector 44. Since the RBS 28 needs to know which exact codes is allocated to each physical channel of the cell (received from the RNC), the RBS 28 has full knowledge of the exact codes in the code tree are allocated and which are not. Depending on the specific implementation, the RNC 26 can send down to the RBS 28 which exact codes shall be used for HS-PDSCH, or alternatively the code assignments can be totally left to the RBS 28.

The amount of downlink power available for the radio base station (RBS) 28 and the amount of spreading codes available (unused) by the radio base station (RBS) 28 limits the maximum amount of downlink power and coding that can be used for transmission on the high-speed downlink shared channel (HS-DSCH).

Figure 4:
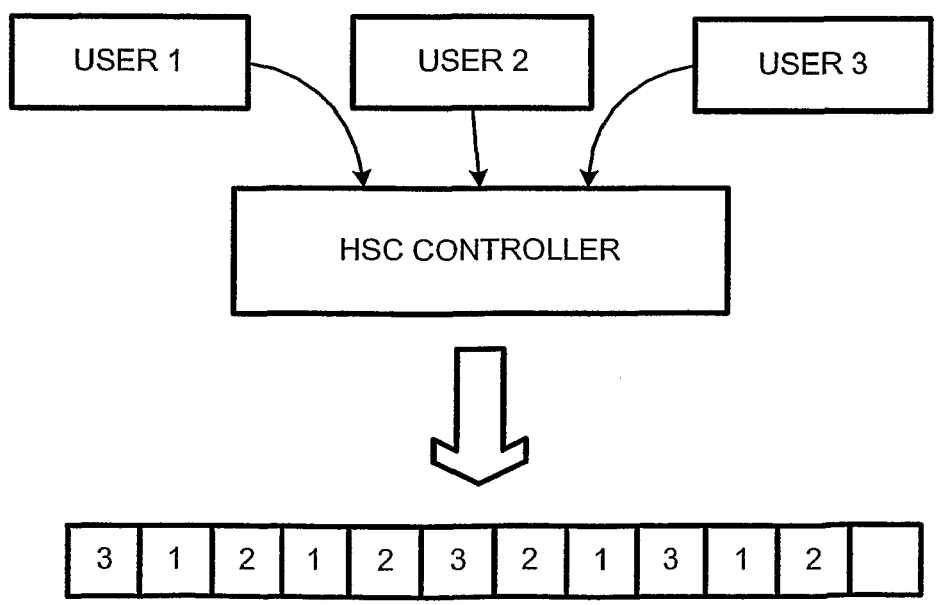
FIG. 4 is a diagrammatic view of a high-speed shared channel concept.

The HSDPA controller 40 determines the transport format for each transmission time interval (TTI), making such determination on the order of every 2 milliseconds. When determining what transport format to utilize when transmitting for a particular user in the particular user's time interval or TTI (see FIG. 4), the transport format selector 44 uses the plural input parameters illustrated in FIG. 2 (the latest reported CQI reported for the user; the available downlink power; the available number of HS-DSCH codes; and the amount of data this user has available for transmission) as factors for determining the transport format for this user for this interval (TTI) on the high-speed downlink shared channel (HS-DSCH). Depending on the conditions at the time these four factors were obtained, use of these four factors alone by transport format logic 48 may not reflect such phenomena as the interference changes and the like when transmission actually occurs on the high-speed downlink shared channel (HS-DSCH).

Therefore, the transport format selector 44 features radio quality promotion processing 50 which promotes or protects radio quality (e.g., the signal to noise ratio (SIR)) in the cell of the high-speed downlink shared channel (HS-DSCH) against radio quality fluctuation due to one or more of fast fading, power variations, or interference variations. The radio quality fluctuation may be a downlink power variation caused by or accompanying transmission on the high-speed downlink shared channel (HS-DSCH) itself (or any other channel such as a DPCH), and may jeopardize reliability of or render inaccurate (e.g., stale) a reported value for one of the input parameters ascribed to a radio condition and utilized to determine the transport format (herein also referred to as the "first input parameter"). Indeed, the radio quality fluctuation may result in a difference between the reported value for the last reported CQI and an actual CQI upon transmission of the high-speed downlink shared channel (HS-DSCH) (e.g., a difference between the reported value for the first parameter and an actual value for the first input parameter, the actual value for the first input parameter describing a condition which exists upon transmission of the high-speed downlink shared channel (HS-DSCH)).

In essence, in at least one example embodiment, the transport format selector 44 promotes radio quality of the high-speed downlink shared channel (HS-DSCH) by compensating, in the determining of the transport format, for any inaccurate representation by the reported input value of a radio condition which may have changed at the time of transmission of the high-speed downlink shared channel (HS-DSCH). As mentioned above, the first input parameter (for which the transport format selector anticipates a difference) can be, for example, a channel quality indicator (CQI) and the radio condition can be radio quality.

Figure 2A:
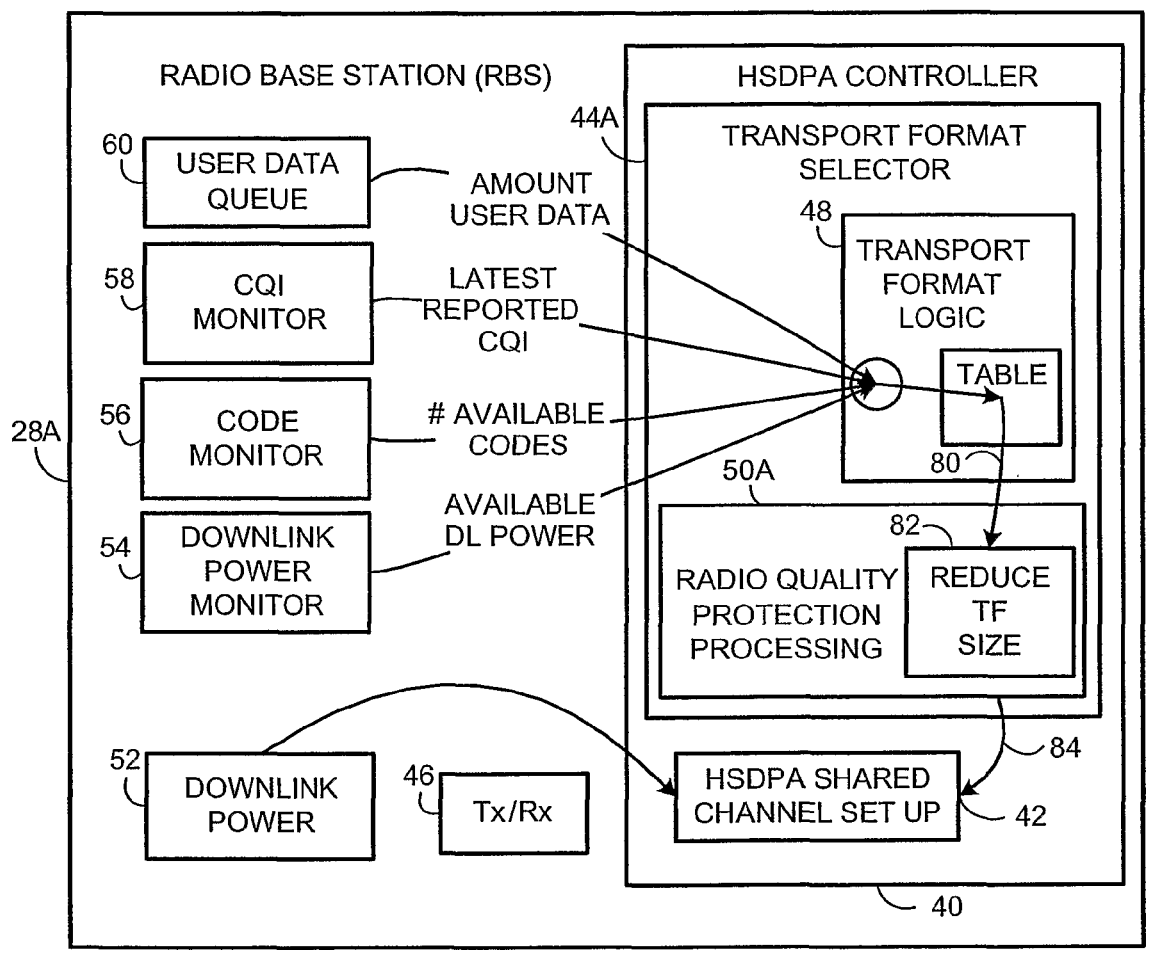
FIG. 2A-2D are schematic views of network nodes having example transport format selectors with differing implementations of example radio quality promotion processing.

FIG. 2A illustrates a first example mode in which the transport format selector 44A uses the latest reported value of the channel quality indicator and at least another of the plural input parameters (preferably the three other input parameters mentioned above) to obtain a candidate transport format size. Specifically, in the particularly illustrated example scenario of FIG. 2A, all four input parameters are applied to transport format logic 48 in conventional manner, from which a candidate transport format size results as depicted by arrow 80. In one example implementation, the candidate transport format size can be obtained from a conventional mapped (lookup) transport format table which may comprise transport format logic 48.

The radio quality promotion processing 50A receives the candidate transport format size, and (as indicated by process 82) obtains (by reducing or otherwise deriving therefrom) an actual transport format size for high-speed downlink shared channel (HS-DSCH). The actual transport format size obtained by radio quality promotion processing 50A, depicted by arrow 84 in FIG. 2A, is smaller than the candidate transport format size. The smaller actual transport format size obtained by radio quality promotion processing 50A is forwarded to HSDPA shared channel setup unit 42 for use in setting up the high-speed downlink shared channel (HS-DSCH).

In using the smaller actual transport size, the transport format selector provides greater energy per data bit than would be afforded by the candidate transport format size. Use of the smaller actual transport size thus counters any power step increase occasioned by transmission on the high-speed downlink shared channel (HS-DSCH). Therefore, it is less likely that the power step up will degrade the signal to noise ratio (SIR) significantly, and therefore less likely to lead to a failed transmission.

Figure 2B:
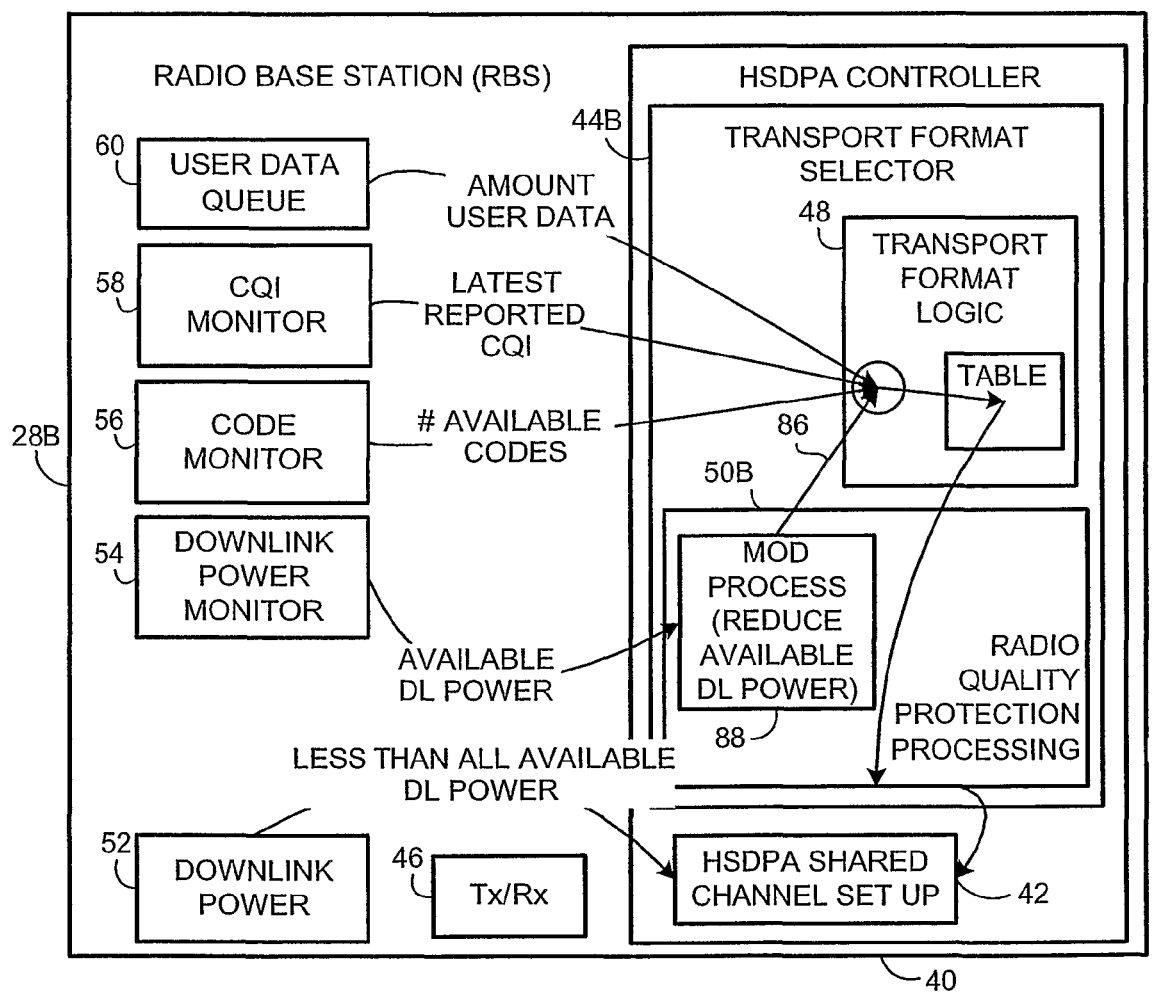

In another example mode illustrated in FIG. 2B, in anticipating the difference between the reported input value and the actual value for the first input parameter, transport format selector 44B performs a modification of a value of a selected one of the plural input parameters to obtain a modified input parameter. The transport format selector further uses the modified input parameter and the other plural input parameters to obtain an actual transport format size. The actual transport format size so obtained is smaller than that would have been obtained had the modification not been performed, thereby causing less self-interference and improving the SIR relative to what would have occurred had the modification not been performed.

FIG. 2B particularly shows modification of the available downlink power parameter, i.e., a scenario in which the modified input parameter is available downlink power and the modified value is modified available downlink power. FIG. 2B shows a modified available downlink power value being applied as arrow 86 from a modification process 88 which comprises radio quality promotion processing 50B. The modification process 88 serves, e.g., to obtain the modified available downlink power value by reducing the available downlink power obtained from downlink power monitor 54. The modified available downlink power value being is applied as depicted by arrow 86, along with the other three input parameters, to transport format logic 48. The transport format logic 48 then provides an actual transport size which is smaller than would have been provided had radio quality promotion processing 50B not modified the modified input parameter, but preferably with the same energy per bit. The actual transport format size so obtained is smaller than that would have been obtained had the modification not been performed. Thus the smaller transport size improves the SIR compared to what would have occurred had the modification not been performed.

The smaller actual transport format size obtained by radio quality promotion processing 50B is forwarded to HSDPA shared channel setup unit 42 for use in setting up the high-speed downlink shared channel (HS-DSCH). In setting up the high-speed downlink shared channel (HS-DSCH) for the FIG. 2B mode, the HSDPA shared channel setup unit 42 does not utilize all available power at the base station for the user's transmission time interval (TTI). Rather, the HSDPA shared channel setup unit 42 uses a smaller power step (something less than total available downlink power) for the user's TTI in the high-speed downlink shared channel (HS-DSCH).

As one example, the HSDPA shared channel setup unit 42 allocates the power for the high speed downlink shared channel during the user's TTI so that the total power transmitted during the user's TTI (e.g., $P_{TTI}$) for the high speed downlink shared channel is according to Expression 1. In Expression 1, $P_{max\_RBs}$ is the maximum power of the radio base station; $P_{average}$ is the average downlink power of the RBS over time; $P_{delta}$ is a maximum permitted power change from an (e.g., average) power for one TTI to the power of the next TTI (thus assuring that power is not increased to large a step too quickly). Expression 1 is not limiting, it be understood that other equations or techniques can instead be utilized.

$$P_{TTI} < \text{minimum}(P_{max\_RBS}, P_{average} + P_{delta}) \quad \text{Expression 1}$$

Figure 2C:
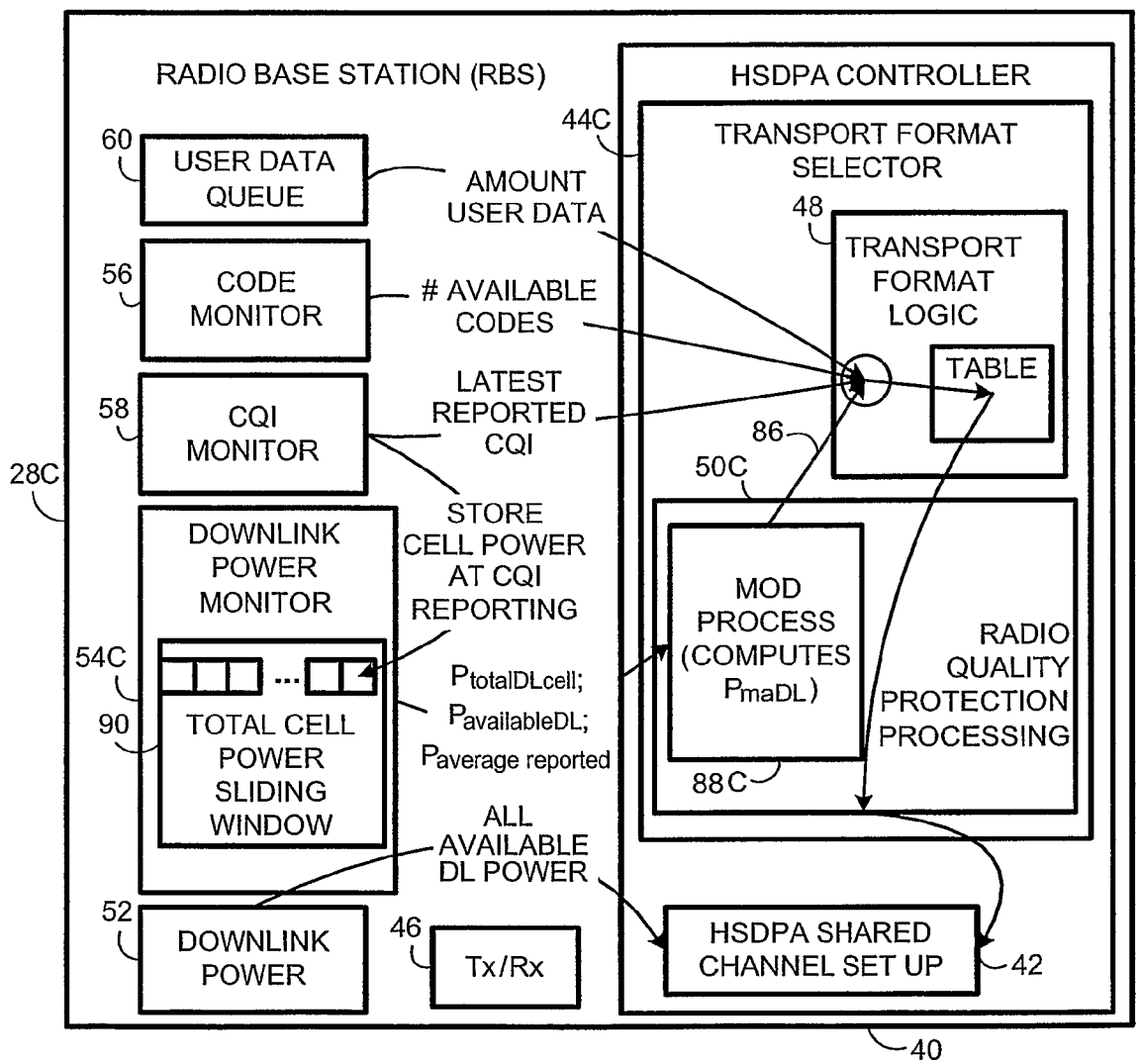

FIG. 2C illustrates a specific implementation somewhat akin to the FIG. 2B mode, but wherein the available downlink power applied by downlink power monitor 54 to radio quality promotion processing 50C is an average available downlink power value and wherein all available downlink power is utilized for the TTI in the high-speed downlink shared channel (HS-DSCH). In the FIG. 2C embodiment, whenever a CQI measurement reported is received, CQI monitor 58 notifies downlink power monitor 54C of the receipt. For the corresponding CQI report receipt, downlink power monitor 54C stores the total cell power at the time of the report receipt in a total cell power sliding window 90 maintained for each user by downlink power monitor 54C. The total cell power sliding window 90 stores a predetermined number (e.g., about 10 milliseconds worth) of total cell power values in total cell power sliding window 90, and uses the average of the values maintained in total cell power sliding window 90 to determine an average power when the reported value of CQI was reported ($P_{average\ reported}$). The downlink power monitor 54C then applies the following parameters to transport format selector 44C, and particularly to modification process 88C of radio quality promotion processing 50C: total downlink cell power ($P_{totalDLcell}$); available downlink power ($P_{availableDL}$); and $P_{average\ reported}$. Using these parameters, modification process 88C determines a modified available downlink power ($P_{maDL}$), in decibels, using Expression 2. In Expression 2, K is a constant less than 1.0 and preferably K is about 0.9.

$$P_{maDL} = P_{availableDL} - (K*(P_{totalDLcell} - P_{average\ reported})) \quad \text{Expression 2}$$

In setting up the high-speed downlink shared channel (HS-DSCH) for the FIG. 2C mode, the HSDPA shared channel setup unit 42 does utilize all available power at the base station for the user's transmission time interval (TTI). Thus, the FIG. 2C mode differs from the FIG. 2B mode in that, e.g., the FIG. 2C modes does allocate all available downlink power to the user's TTI in the high-speed downlink shared channel (HS-DSCH).

In the FIG. 2C mode the cell power sliding window 90 is maintained for each user. In actuality, this can be done in any of several ways. For example, there can be a direct per user storage as previously described with reference to FIG. 2C. Alternatively, the power monitor might store the total power value (x) at every y millisecond interval, and for each UE reporting its CQI up until the next downlink power sample, the CQI is connected to or associated with the most recent sampled value x. So for a UE there is a connection or association to a specific power value by, e.g., a pointer or the like to a power value, thereby requiring storage of less values.

FIG. 2B and FIG. 2C thus show embodiments in which the transport format selector performs a modification of a value of a selected one of the plural input parameters to obtain a modified input parameter, with the selected input parameter which is modified being available downlink power parameter.

Figure 2D:
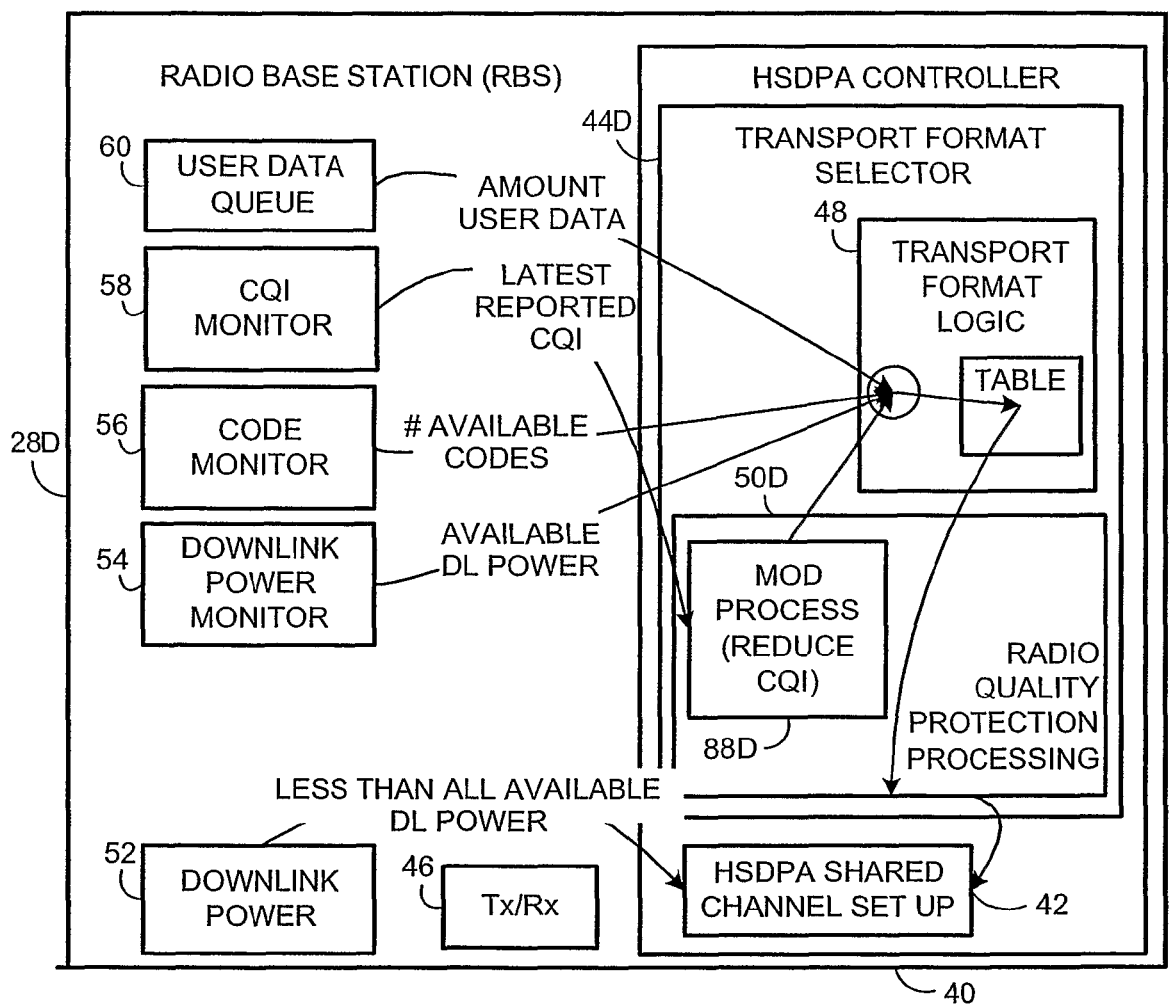

It should be understood that, in yet other embodiments, others of the input parameters can be the "selected" input parameter which is modified prior to input to transport format logic 48. For example, in these other embodiments, the amount of user data, the number of available codes, or the CQI can be modified prior to input to transport format logic 48. For example, FIG. 2D shows another example mode wherein the latest report CQI as maintained by CQI monitor 58 is modified (diminished) by modification process 80D prior to input to transport format logic 48.

The transport format selectors 44 disclosed herein with their radio quality promotion processing not only include the CQI and total available power in the transport format selection (TF) for HSDPA, but also include the downlink power change between the CQI estimation and a transmission occasion. The transport format encompasses the number of data bits, protective coding etc. that is used in the transmission.

When the system selects the mobile terminal (MT) to be scheduled for data transmission on the common downlink channel (HS-DSCH) the system checks the latest reported CQI; the available downlink power; the available number of HS-DSCH codes; and, the amount of data this user has available for transmission. This information is used as input to a system pre-defined table (e.g., transport format logic 48) that maps to the transport format (TF) which should be used during the data transmission for this user.

If the total downlink cell power is constant over time, the mapped transport format obtained from transport format logic 48 would be sufficient information to be able to select an optimal TF that gives sufficient energy per data bit. However, if the downlink power of the cell, during the CQI determination, is much lower than the downlink cell power that is used during subsequent transmission (e.g., when a power step subsequently occurs), then the radio quality (SIR) per data bit becomes lower than optimal. For such cases, the transport format selector 44 with the radio quality promotion processing 50 described herein provides additional protection or precaution.

There are two main solutions for dealing with such a case of power step increase so as not adversely to affect SIR. The first solution is to limit the power step increase size, and thereby limit the interference increase so that the SIR requirement can be met or (perhaps more correctly) the SIR degradation can be kept under control. The second solution is to decrease the transport format size so more energy is allocated per transport format, compared with the situation in which the power step is not considered. A combination of these two solutions is also possible, e.g., limiting the power step and also lowering the transport format size. However, such combination is only a gain if the transport size is larger than if only the first solution were implemented. Also, the combination gives less throughput than the first solution since not all power is used. However, the combination can still be beneficial to avoid too large power steps, and thereby provide smoother power conditions for the power control on the other DPCH channels.

The transport format selector 44A of FIG. 2A initially selects the same amount of power for HS-DSCH as does the transport format logic 48, but subsequently uses a smaller transport size so that the energy per data bit is increased and the optimal SIR per data bit can be achieved.

The transport format selector 44B selects a less amount of "available downlink power" as input for the HS-DSCH TF table (e.g., transport format logic 48). Thereby a smaller TF is selected, and less power is allocated to HS-DSCH, with the result that the power (interference) change from the CQI estimation period is less.

Both the transport format selector 44A and transport format selector 44B are advantageous implementations, with differing implementation and complexity considerations. The transport format selector 44A has the benefit of resulting in better resource usage and thereby larger throughput.

Then, for the FIG. 2C example mode, when transmitting the data on HS-DSCH, the whole available power is used. Thereby the transport format and user data SIR is adapted to the interference changes in the radio caused by the own load variations.

Figure 3:
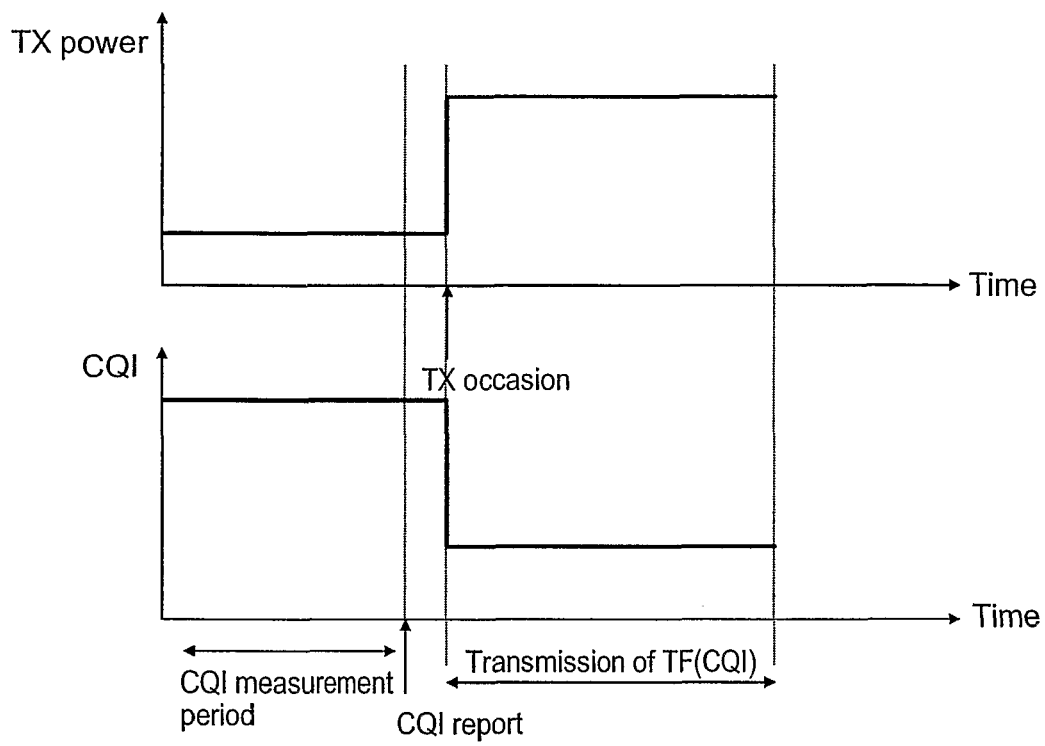
FIG. 3 is a graphical view illustrating selecting a smaller transport format size or avoiding a too quick and too large a power increase step

The transport format selectors disclosed herein avoid a low SIR for the user data at HS-DSCH transmission when the power step increase is large. Such is controlled by considering the resulting power step and selecting a smaller transport format size or by avoiding a too quick and too large a power increase step as illustrated in FIG. 3.

Advantageously, during low load situations more optimal transport formats are selected for HSDPA. Consequently, less failed transmissions and re-transmissions occur, resulting in increased end-user and throughput.

Less self-interference is achieved by transmission of less power, regardless of transport format size. A smaller transport format size improves the energy per bit, and thereby improves the signal to noise (SIR) ratio (but has essentially no impact on the self-interference). Therefore, while using less power without any transport format size change provides less energy per bit and having less interference, is not advantageous. Using less power and smaller transport format size provides less self-interference and the same energy per bit, and is advantageous. Using the same power and smaller transport format size provides the same self-interference, but more energy per bit and therefore is also advantageous.

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed is:

1. A radio access network node comprising a transport format selector which uses plural input parameters including a reported value for a first input parameter for determining a transport format for a high-speed downlink shared channel, characterized in that the transport format selector is arranged to promote radio quality of the high-speed downlink shared channel by compensating, in the determining of the transport format, for any inaccurate representation by a reported input value of a first input parameter, the first input parameter being ascribed to a radio condition which has changed at the time of transmission of the high-speed downlink shared channel;

the first parameter, for which the transport format selector anticipates a difference, is a channel quality (CQI) and the radio condition is radio channel quality; and wherein the transport format selector uses the reported value of the channel quality indicator and at least another of the plural input parameters to obtain a candidate transport format size, and then uses for the high-speed downlink shared channel (HS-DSCH) an actual transport format size smaller than the candidate transport format size, thereby providing the actual transport format size a greater energy per data bit than would be afforded by the candidate transport format size.

2. The apparatus of claim 1, wherein the candidate transport format size is obtained with reference to a mapped table.

3. The apparatus of claim 1, wherein in anticipating the difference the transport format selector performs a modification of a value of a selected one of the plural input parameters to obtain a modified input parameter, and uses the modified input parameter and the other plural input parameters to obtain an actual transport format size, the actual transport format size being smaller than that would have been obtained had the modification not been performed, thereby providing by the actual transport format size a greater signal to noise ratio than would have been be afforded had the modification not been performed.

4. The apparatus of claim 3, wherein the modified input parameter is available downlink power.

5. The apparatus of claim 4, wherein the modified value is modified available downlink power, and wherein the modified available downlink power ($P_{maDL}$) is determined by the following expression:

$$P_{maDL} = P_{availableDL} - (K*(P_{totalDLcell}) - P_{average\ reported}))$$

wherein
$P_{availabeDL}$ is available downlink power;
K is a constant less than 1.0;
$P_{totalDLcell}$ is total downlink cell power; and
$P_{average\ reported}$ is average power when the reported value of CQI was reported.

6. The apparatus of claim 3, wherein the modified input parameter is a channel quality indicator.

7. For use in a radio access network node, a method comprising:
 using plural input parameters including a reported value for a first input parameter to determine a transport format for a high-speed downlink shared channel: characterized by
 in determining the transport format, compensating for any inaccurate representation by the reported input value of the first input parameter, the first input parameter being ascribed to a radio condition which has changed at the time of transmission of the high-speed downlink shared channel, the first input parameter, for which the transport format selector anticipates a difference, is a channel quality indicator (CQI) and the radio condition is radio channel quality;
 and using the reported value of the channel quality indicator and at least another of the plural input parameters to obtain a candidate transport format size, and then using for the high-speed downlink shared channel an actual transport format size smaller than the candidate transport format size, thereby causing less self-interference and providing a greater signal to noise ratio than would be afforded by the candidate transport format size.

8. The method of claim 7, further comprising obtaining the candidate transport format size from a mapped table.

9. The method of claim 7, wherein in anticipating the difference the method further comprises:
 performing a modification of a value of a selected one of the plural input parameters to obtain a modified input parameter;
 using the modified input parameter and the other plural input parameters to obtain an actual transport format size, the actual transport format size being smaller than that would have been obtained had the modification not been performed, thereby providing a greater signal to noise ratio than would have been be afforded had the modification not been performed.

10. The method of claim 9, wherein the modified input parameter is available downlink power.

11. The method of claim 10, wherein the modified value is modified available downlink power, and further comprising determining the modified available downlink power ($P_{maDL}$) using the following expression:

$$P_{maDL} = P_{availableDL} - K(P_{totalDLcell}) - P_{average\ reported}))$$

wherein $P_{availableDL}$ is available downlink power;
K is a constant less than 1.0;
$P_{totalDLcell}$ is total downlink cell power; and
$P_{average\ reported}$ is average power when the reported value of CQI as reported.

12. The method of claim 9, wherein the modified input parameter is a channel quality indicator.

* * * * *